United States Patent [19]

Myong

[11] Patent Number: 6,072,679
[45] Date of Patent: Jun. 6, 2000

[54] ELECTRIC PROTECTION SYSTEMS INCLUDING PTC AND RELAY-CONTACT-PROTECTING RC-DIODE NETWORK

[76] Inventor: Inho Myong, 36617 Spruce St., Newark, Calif. 94560-2162

[21] Appl. No.: 09/273,635

[22] Filed: Mar. 23, 1999

Related U.S. Application Data

[63] Continuation of application No. 09/019,766, Feb. 6, 1978, abandoned.

[51] Int. Cl.⁷ .................................................. H02H 3/00
[52] U.S. Cl. ...................... 361/93.7; 361/93.1; 361/93.9; 361/106; 361/165
[58] Field of Search ................................. 361/93.1, 93.7, 361/93.8, 93.9, 93.4, 106, 165

[56] References Cited

U.S. PATENT DOCUMENTS

| | | | |
|---|---|---|---|
| 4,237,441 | 12/1980 | Van Konynenburg et al. | 338/22 |
| 4,238,812 | 12/1980 | Middleman et al. | 361/106 |
| 4,315,237 | 2/1982 | Middleman et al. | 338/22 |
| 4,317,027 | 2/1982 | Middleman et al. | 219/553 |
| 4,320,309 | 3/1982 | Griffiths et al. | 307/132 T |
| 4,426,633 | 1/1984 | Taylor | 338/25 |
| 4,545,926 | 10/1985 | Fouts et al. | 252/511 |
| 4,631,474 | 12/1986 | Dolland et al. | 324/73 |
| 4,689,475 | 8/1987 | Matthiesen | 219/553 |
| 4,724,417 | 2/1988 | Au et al. | 338/22 |
| 4,774,024 | 9/1988 | Deep et al. | 252/511 |
| 4,780,598 | 10/1988 | Fahey et al. | 219/511 |
| 4,800,253 | 1/1989 | Kleiner et al. | 219/553 |
| 4,845,838 | 7/1989 | Jacobs et al. | 29/671 |
| 4,857,880 | 8/1989 | Au et al. | 338/22 |
| 4,859,836 | 8/1989 | Lunk et al. | 219/548 |
| 4,907,340 | 3/1990 | Fang et al. | 29/610.1 |
| 4,924,074 | 5/1990 | Fang et al. | 219/548 |
| 4,935,156 | 6/1990 | van Konynenburg et al. | 219/553 |
| 4,967,176 | 10/1990 | Horsma et al. | 338/22 |
| 5,049,850 | 9/1991 | Evans et al. | 338/22 |
| 5,089,801 | 2/1992 | Chan et al. | 338/22 |
| 5,296,996 | 3/1994 | Hansson et al. | 361/24 |
| 5,378,407 | 1/1995 | Chandler et al. | 252/513 |
| 5,451,919 | 9/1995 | Chu et al. | 338/22 |
| 5,451,921 | 9/1995 | Crawford et al. | 338/220 |
| 5,590,010 | 12/1996 | Ceola et al. | 361/93.4 |
| 5,645,746 | 7/1997 | Walsh | 219/505 |
| 5,666,254 | 9/1997 | Thomas et al. | 361/8 |
| 5,689,395 | 11/1997 | Duffy et al. | 361/93 |
| 5,745,322 | 4/1998 | Duffy et al. | 361/45 |
| 5,852,397 | 12/1998 | Chan et al. | 338/22 |
| 5,864,458 | 1/1999 | Duffy et al. | 361/93 |

FOREIGN PATENT DOCUMENTS

WO 98/02946  1/1998  WIPO .............................. H02H 3/08

OTHER PUBLICATIONS

Patent Abstracts of Japan, vol. 095, No. 010, Nov. 30, 1995 and Japanese Publication No. 07-170727 (URD), Jul. 4, 1995 (abstract only).
U.S. Application No. 09/311,785 (Duffy et al, filed May 14, 1999), related to Application No. 08/584,861 (filed Jan. 5, 1996).
U.S. Application No. 08/658,782 (Duffy et al, filed Jun. 5, 1996).
U.S. Application No. 09/156,933 (Myong et al, filed Sep. 18, 1998), related to Application No. 08/682,067 (filed Jul. 16, 1996).
U.S. Application No. 08/682,172 (Myong, filed Jul. 16, 1996).
U.S. Application No. 09/248,166 (Myong, filed Feb. 9, 1999), related to Application No. 08/868,905 (filed Jun. 4, 1997).
Search Report dated May 28, 1999, for International Application No. PCT/US 99/02261.

*Primary Examiner*—Michael J. Sherry

[57] ABSTRACT

An electrical protection system includes a control element of a series combination of a PTC device thermally coupled with a resistive device, and a relay coil coupled with relay contacts. If the relay contacts are open the only way in which they can be closed is by supplying current to the relay coil through a resistance-capacitance network. A diode permits current to pass through the resistance-capacitance network to the relay coil but prevents current from flowing in the opposite direction thereby preventing relay contact chatter, contact fusing, and potential relay catastrophic failure.

1 Claim, 1 Drawing Sheet

ELECTRIC PROTECTION SYSTEMS INCLUDING PTC AND RELAY-CONTACT-PROTECTING RC-DIODE NETWORK

This is a continuation of patent application Ser. No. 09/019,766, filed on Feb. 6, 1998, and now abandoned.

BACKGROUND OF THE INVENTION

CROSS-REFERENCE TO RELATED APPLICATION

The present application is related to U.S. patent application Ser. No. 09/019,767, filed on Feb. 6, 1998, now abandoned in favor of a co-pending continuation application Ser. No. 09/274,561, filed on Mar. 23, 1999. In these related applications there are described a number of improved protection systems based on those disclosed in Ser. Nos. 08/869,905, 08/682,067 and 08/682,172. The entire disclosure of U.S. patent applications Ser. Nos. 09/019,767 and 09/274,561 is incorporated herein by reference for all purposes. The present invention provides further improvements in the systems disclosed in Ser. Nos. 08/868,905, 08/682,172 and in Ser. Nos. 09/019,767 and 09/274,561 having the same filing date as the parent of this application.

1. Field of the Invention

This invention relates to electrical systems which contain positive temperature coefficient (PTC) circuit protection devices, particularly such systems in automobiles and other wheeled vehicles.

2. Introduction to the Invention

PTC devices are well known. Particularly useful devices contain PTC elements composed of a PTC conductive polymer, i.e. a composition comprising an organic polymer and, dispersed or otherwise distributed therein, a particulate conductive filler, e.g. carbon black, or a metal or a conductive metal compound. Such devices are referred to herein as polymer PTC, or PPTC, devices. Other PTC materials are also known, e.g. doped ceramics, but are not as generally useful as PTC conductive polymer, in particular because they have higher resistivities. PTC devices can be used in a number of different ways, and are particularly useful in circuit protection applications, in which they function as remotely resettable fuses to protect electrical components from excessive currents and/or temperatures. Components which can be protected in this way include motors, batteries, loudspeakers and wiring harnesses in automobiles. The use of PPTC devices in this way has grown rapidly over recent years, and continues to increase. Reference may be made for example to U.S. Pat. Nos. 4,237,441, 4,238,812, 4,315,237, 4,317,027, 4,426,633, 4,545,926, 4,689,475, 4,724,417, 4,774,024, 4,780,598, 4,800,253, 4,845,838, 4,857,880, 4,859,836, 4,907,340, 4,924,074, 4,935,156, 4,967,176, 5,049,850, 5,089,801, 5,378,407, 5,451,919, 5,451,921, and 5,645,746, and to copending commonly assigned U.S. application Ser. No. 08/900,787 (Graves et al., filed Jul. 25, 1997), now U.S. Pat. No. 5,852,397 the disclosures of which are incorporated herein by reference for all purposes.

More recently, it has been proposed to combine PTC devices with other electrical components to provide circuit protection systems which respond to faults in ways which make use of the characteristics of both the PTC device and the electrical component. Reference may be made for example to U.S. Pat. Nos. 5,666,254 and 5,689,395, and to copending commonly assigned U.S. application Ser. Nos. 08/564,465 (Duffy et al., filed Nov. 29, 1995), now U.S. Pat. No. 5,864,458, Ser. No. 08/563,321 (Duffy et al., filed Nov. 28, 1995), now Pat. No. 5,745,322 Ser. No. 08/584,861 (Duffy et al., filed Jan. 5, 1996), abandoned in favor of continuation application Ser. No. 09/145,799, filed on Sep. 2, 1998, which has been abandoned in favor of continuation application Ser. No. 09/311,785 filed on May 14, 1999 Ser. No. 08/658,782 (Duffy et al., filed Jun. 5, 1996) now abandoned 08/682,067 (Myong et al., filed Jul. 16, 1996) abandoned in favor of continuation application Ser. No. 09/156,933, filed Sep. 18, 1998 and 08/682,172 (Myong, filed July 16, 1996) and 08/868,905 (Myong, filed Jun. 4, 1997), abandoned in favor of continuation application Ser. No. 09/248,166, filed on Feb. 9, 1999 the disclosures of which are incorporated herein by reference for all purposes.

Ser. Nos. 08/682,067 and 08/682,172 describe protection systems which comprise a sensor element (typically a resistor) and a circuit interruption element (typically a relay) in series with the load, and a control element (typically a PTC device in parallel with the sensor element) which links the sensor element and the circuit interruption element so that an overcurrent is detected by the sensor element, and causes a change in the control element, which in turn causes a change in (typically opens) the circuit interruption element. Depending on the arrangement of these and other components, the system can (a) latch in an open state, either with or without a trickle current to keep the PTC device in a tripped condition, or (b) reclose if the overcurrent has gone away or cycle between open and closed positions if the overcurrent remains. Ser. No. 08/868,905 describes particularly useful devices for use in the protection systems of Ser. Nos. 08/682,067 and 08/682,172.

SUMMARY OF THE INVENTION

As disclosed in related applications Ser. Nos. 09/019,767 and 09/274,561 the manually-operated relay switch disclosed in 08/682,067 and 08/682,172 can advantageously be replaced by a remotely operated system, preferably an RC circuit in the line to the relay coil. However, I have discovered that if there is a short circuit in the load when the relay contacts are closed, there are some conditions under which the relay contacts can chatter (i.e. continually open and close), which can lead to the contacts welding shut, and catastrophic failure. This occurs when the fault resistance is such that the current which can flow through the short circuit exceeds the current that the power source can supply. Under these circumstances, when the relay closes onto the short circuit, the system voltage (e.g. battery voltage), drops drastically. This voltage drop causes the relay to drop out restoring the battery voltage. Immediately after this, since the battery voltage has been recovered, the relay picks up again reducing the battery voltage, and the cycle continues.

The chattering is primarily due to the fact that as the system voltage drops, the voltage across the capacitor in the RC network discharges in the reverse direction, causing the relay coil to drop out.

I have realized, in accordance with the present invention, that this problem can be solved by adding to the system a diode which will prevent the capacitor from discharging in this way, and thus will keep the relay coil energized, and the relay contacts closed, for long enough to trip the PPTC and open the relay in the desired way.

An embodiment of the invention comprises an electrical protection system which can be connected between an electrical power supply and an electrical load to form an operating circuit, the operating circuit having an on state and an off state and comprising a current carrying line and a return line, and which when so connected protects the circuit from overcurrents, the system having a normal operating condition and a fault condition, and comprising:

a. a set of relay contacts which, when the system is so connected, is connected in series between the power supply and the load, and has:
   i. a closed state which permits the flow of a normal current, $I_{NORMAL}$, when the system is in the normal operating condition, and
   ii. an open state which permits the flow of at most a reduced current, substantially less than $I_{NORMAL}$, when the system is in the fault condition;

b. a resistive device which, when the system is so connected, is connected in series with the set of relay contacts and the load, and has
   i. a normal state, when the current in the system does not exceed the normal current, $I_{NORMAL}$, by a predetermined current amount, and
   ii. a fault state, when the current in the system exceeds the normal current, $I_{NORMAL}$, by the predetermined amount;

c. a control element which comprises a series combination of
   i. a PTC device thermally coupled with the resistive device; and
   ii. a relay coil coupled with the relay contacts;

the series combination being connected across the power supply, between the current carrying line and the return line, with the PTC device connected to the current carrying line and the relay coil coupled to the return line;

the set of relay contacts changing from its closed state to its open state, thereby causing the system to change from its normal operating condition to its fault condition, when the resistance of the PTC device increases by a predetermined resistance amount in response to the resistive element changing from its normal state to its fault state;

d. a resistance-capacitance network through which current can be supplied to the relay coil, so that if the relay contacts are open, the only way in which they can be closed is by supplying current to the relay coil through the resistance capacitance network; and e. a diode or other electrical component which permits current to pass through the resistance-capacitance network to the relay coil but which prevents it from flowing in the opposite direction.

DETAILED DESCRIPTION OF THE PREFERRED EMBODIMENTS

Figure 1:
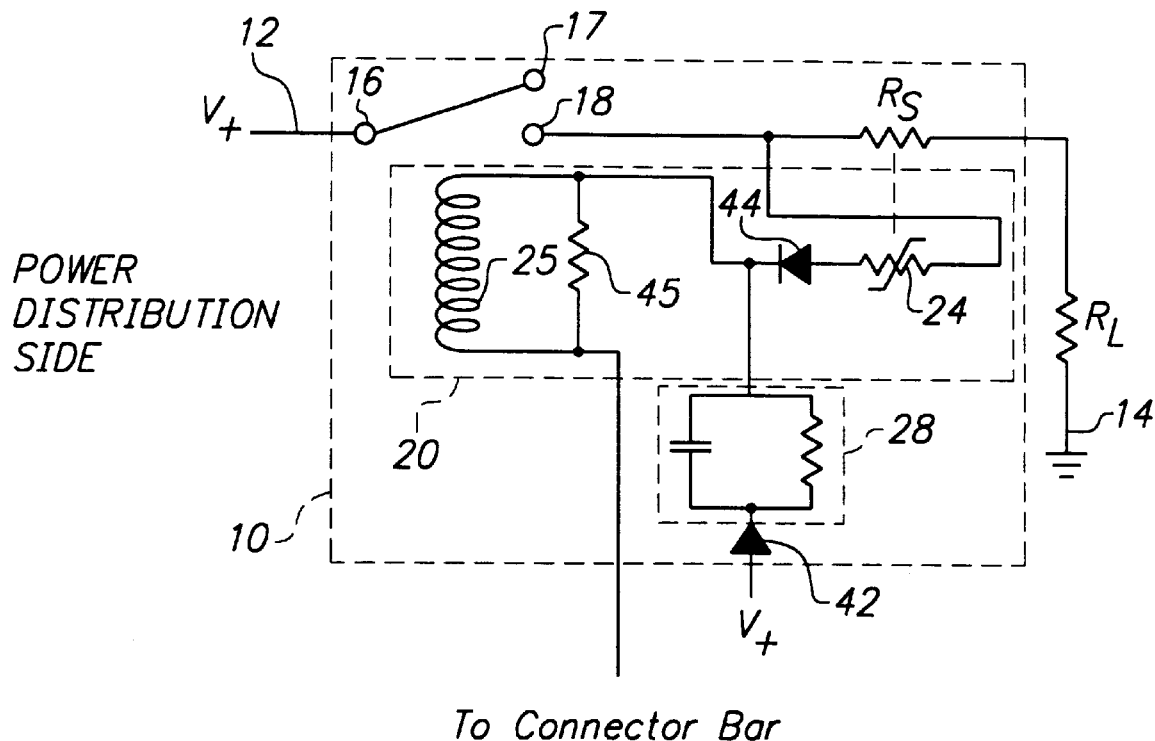
FIG. 1 is a circuit diagram according to an embodiment of the present invention.

As illustrated in FIG. 1, this invention provides an electrical protection system which can be connected between an electrical power supply and an electrical load to form an operating circuit, the operating circuit having an on state and an off state and comprising a current carrying line and a return line, and which when so connected protects the circuit from overcurrents, the system having a normal operating condition and a fault condition, and comprising:

a. a set of relay contacts 16, 17 and 18 which, when the system is so connected, is connected in series between the power supply V+ and the load $R_L$, and has:
   i. a closed state which permits the flow of a normal current, $I_{NORMAL}$, when the system is in the normal operating condition, and
   ii. an open state which permits the flow of at most a reduced current, substantially less than $I_{NORMAL}$, when the system is in the fault condition;

b. a resistive device $R_s$ which, when the system is so connected, is connected in series with the set of relay contacts 16, 17 and 18 and the load $R_L$, and has
   i. a normal state, when the current in the system does not exceed the normal current, $I_{NORMAL}$, by a predetermined current amount, and
   ii. a fault state, when the current in the system exceeds the normal current, $I_{NORMAL}$, by the predetermined amount;

c. a control element 20 which comprises a series combination of
   i. a PTC device 24 thermally coupled with the resistive device $R_s$; and
   ii. a relay coil 25 coupled with the relay contacts;

the series combination being connected across the power supply, between the current carrying line and the return line, with the PTC device connected to the current carrying line and the relay coil coupled to the return line;

the set of relay contacts changing from its closed state to its open state, thereby causing the system to change from its normal operating condition to its fault condition, when the resistance of the PTC device increases by a predetermined resistance amount in response to the resistive element changing from its normal state to its fault state;

d. a resistance-capacitance network 28 through which current can be supplied to the relay coil, so that if the relay contacts are open, the only way in which they can be closed is by supplying current to the relay coil through the resistance capacitance network; and e. a diode 42 or other electrical component which permits current to pass through the resistance apacitance network to the relay coil but which prevents it from flowing in the opposite direction.

Figure 2:
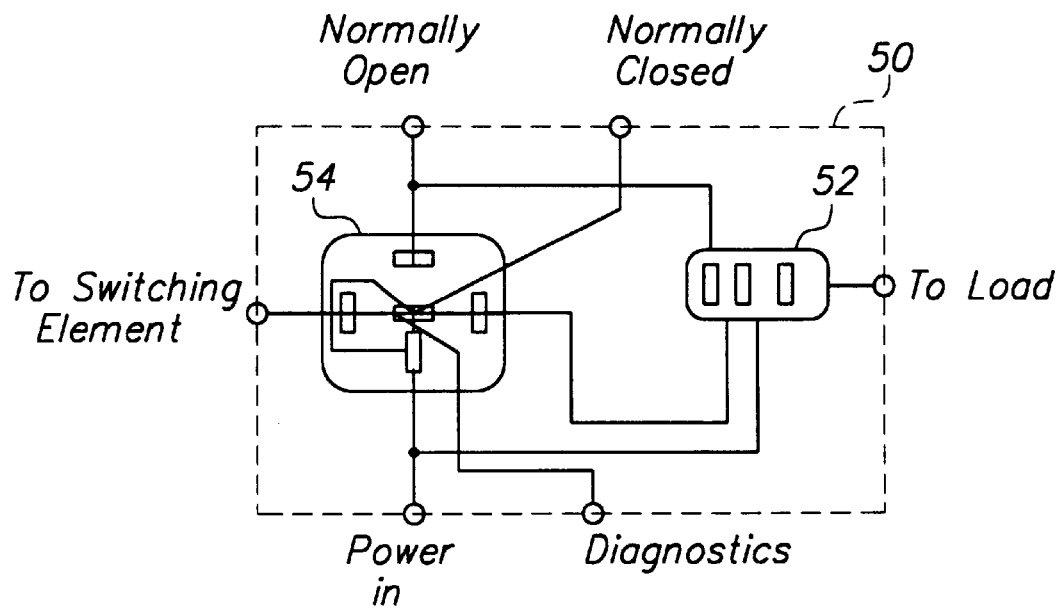
FIG. 2 illustrates a device in which various components in FIG. 1 are packaged.

As shown in FIG. 2, it is particularly preferred that this system should be in the form of a device 50 which comprises components (a), (c), (d) and (e) set out above, and which also comprises five terminals which can be connected to a power source, a normally open side of the relay, a normally close side of the relay, a load, and a switching source (e.g. an electronic control module and associated FET as described in related applications Ser. Nos. 09/019,767 and 09/274,561), respectively. The device may also have a diagnostics pin out which provides logic level voltage when the PTC device has tripped. The logic level voltage is achieved by dividing the coil in appropriate proportions. Preferably the device is a pluggable device.

Various components can be packaged in the device 50 shown in FIG. 2. For example, in FIG. 2 PTC device 24, diode 44, RC network 28 and diode 42 are packaged in device 52. Relay contacts 16, 17, 18, relay coil 25 and resistor 45 are packaged in device 54. Devices 52 and 54 are packaged in device 50.

While the above is a description of the specific embodiments, various modifications, alternative constructions, and equivalents may be used. Therefore, the above description and illustrations should not be taken as limiting the scope of the present invention which is defined by the appended claims.

What is claimed is:

1. An electrical protection system which can be connected between an electrical power supply and an electrical load to form an operating circuit, the operating circuit having an on state and an off state and comprising a current carrying line and a return line, and which when so connected protects the circuit from overcurrents, the system having a normal operating condition and a fault condition, and comprising:

a. a set of relay contacts which, when the system is so connected, is connected in series between the power supply and the load, and has:
      i. a closed state which permits the flow of a normal current, $I_{NORMAL}$, when the system is in the normal operating condition, and
      ii. an open state which permits the flow of at most a reduced current, substantially less than $I_{NORMAL}$, when the system is in the fault condition;
   b. a resistive device which, when the system is so connected, is connected in series with the set of relay contacts and the load, and has
      i. a normal state, when the current in the system does not exceed the normal current, $I_{NORMAL}$, by a predetermined current amount and
      ii. a fault state, when the current in the system exceeds the normal current, $I_{NORMAL}$, by the predetermined amount;
   c. a control element which comprises a series combination of
      i. a PTC device thermally coupled with the resistive device; and
      ii. a relay coil coupled with the relay contacts;
   the series combination being connected across the power supply, between the current carrying line and the return line, with the PTC device connected to the current carrying line and the relay coil coupled to the return line;
   the set of relay contacts changing from its closed state to its open state, thereby causing the system to change from its normal operating condition to its fault condition, when the resistance of the PTC device increases by a predetermined resistance amount in response to the resistive device changing from its normal state to its fault state;
   d. a resistance-capacitance network through which current can be supplied to the relay coil, so that if the relay contacts are open, the only way in which they can be closed is by supplying current to the relay coil through the resistance-capacitance network; and
   e. a diode or other electrical component which permits current to pass through the resistance-capacitance network to the relay coil but which prevents it from flowing in the opposite direction.

* * * * *